United States Patent
Ma et al.

(10) Patent No.: US 9,990,066 B2
(45) Date of Patent: Jun. 5, 2018

(54) CURVED DISPLAY PANEL, MANUFACTURING METHOD THEREOF AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Tao Ma, Beijing (CN); Yinhu Huang, Beijing (CN); Wenlong Wang, Beijing (CN); Zhanqi Xu, Beijing (CN); Zhongzheng Yang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 126 days.

(21) Appl. No.: 15/079,386

(22) Filed: Mar. 24, 2016

(65) Prior Publication Data
US 2017/0031472 A1    Feb. 2, 2017

(30) Foreign Application Priority Data
Jul. 29, 2015   (CN) .......................... 2015 1 0468176

(51) Int. Cl.
*G06F 1/16*    (2006.01)
*G06F 3/041*    (2006.01)
(Continued)

(52) U.S. Cl.
CPC .............. *G06F 3/041* (2013.01); *B29C 65/02* (2013.01); *B29C 65/48* (2013.01); *G06F 1/1637* (2013.01);
(Continued)

(58) Field of Classification Search
USPC ............ 156/247, 272.2, 272.8, 307.1, 307.3, 156/308.2, 701, 711, 712
See application file for complete search history.

(56) References Cited

U.S. PATENT DOCUMENTS 6,654,071 B2 *  11/2003  Chen ....................... G06F 3/044
                                                        345/104
7,563,503 B2 *  7/2009  Gell ........................ B82Y 30/00
                                                        428/304.4
(Continued)

FOREIGN PATENT DOCUMENTS

CN         101980861 A       2/2011
CN         103715136 A       4/2014
(Continued)

OTHER PUBLICATIONS

First Office Action dated Jul. 31, 2017 in corresponding Chinese Patent Application No. 201510468176.4.

*Primary Examiner* — Sing P Chan
(74) *Attorney, Agent, or Firm* — Nath, Goldberg & Meyer; Joshua B. Goldberg; Stanley N. Protigal

(57) ABSTRACT

The invention provides a curved display panel, a manufacturing method thereof, and a display device. The manufacturing method of a curved display panel provided by the present invention comprises steps of: preparing a support plate, which comprises a first base and a metal film deposited on one side of the first base, the thermal expansion coefficient of the first base being different from that of the metal film; bonding a display panel with the support plate; heating the support plate, so that the support plate forces the display panel to bend; and separating the support plate from the display panel, thus forming the curved display panel. The manufacturing method of a curved display panel of the present invention is simple in process and not prone to causing damage to the panel.

14 Claims, 2 Drawing Sheets

(51) Int. Cl.
*B29C 65/02* (2006.01)
*B29C 65/48* (2006.01)
*B29L 31/34* (2006.01)

(52) U.S. Cl.
CPC ............... *B29L 2031/3475* (2013.01); *G06F 2203/04102* (2013.01)

(56) References Cited

U.S. PATENT DOCUMENTS

| | | | |
|---|---|---|---|
| 8,847,229 B2* | 9/2014 | Suzuki | H01L 29/786 257/59 |
| 8,932,899 B2 | 1/2015 | Choi et al. | |
| 9,599,852 B1* | 3/2017 | Galstian | B29D 11/00 |
| 2010/0208190 A1 | 8/2010 | Yoshida | |
| 2011/0007259 A1* | 1/2011 | Okabe | B29D 11/0073 349/158 |
| 2014/0356559 A1 | 12/2014 | Khachatryan et al. | |
| 2015/0041049 A1 | 2/2015 | Chen et al. | |
| 2015/0041050 A1 | 2/2015 | Chen et al. | |
| 2015/0253914 A1* | 9/2015 | Hamada | G06F 3/041 345/173 |

FOREIGN PATENT DOCUMENTS

| | | |
|---|---|---|
| CN | 103715364 A | 4/2014 |
| CN | 104175653 A | 12/2014 |
| CN | 104345952 A | 2/2015 |
| CN | 104346017 A | 2/2015 |
| JP | S64-88577 A | 4/1989 |
| JP | H10-282905 A | 10/1998 |
| JP | 2010-67922 A | 3/2010 |

* cited by examiner

CURVED DISPLAY PANEL, MANUFACTURING METHOD THEREOF AND DISPLAY DEVICE

FIELD OF THE INVENTION

The present invention belongs to the field of display technology, and specifically relates to a manufacturing method of a curved display panel, a curved display panel and a display device.

BACKGROUND OF THE INVENTION

Curved liquid crystal display devices, which have appeared in the display device market at present, are unique in shape and wide in viewing angle, and particularly, have better display effect when applied to large-sized display devices. An important step in a manufacturing process of a curved liquid crystal display device is bending a display panel of the liquid crystal display device. At present, a common bending method is to apply an external force to two ends of the display panel 10 and bend the display panel 10 until a curved display panel 40 is formed, as shown in FIG. 1. However, the inventor discovers that the prior art has the following problems at least: with the external force applied, the glass substrate of the display panel 10 is very likely to be damaged under the action of the external force, and meanwhile, each pixel on the display panel 10 is likely to be deformed due to the external force, resulting in abnormal picture display.

SUMMARY OF THE INVENTION

A technical problem to be solved by the present invention includes providing a curved display panel, a manufacturing method thereof, and a display device, which are simple in process and not prone to causing damage to the display panel, so as to solve at least one of the above problems in the existing manufacturing method of the curved display panel.

According to one aspect of the present invention, there is provided a manufacturing method of a curved display panel, including steps of:

preparing a support plate, which includes a first base and a metal film deposited on one side of the first base, the thermal expansion coefficient of the first base being different from that of the metal film;

bonding a display panel with the support plate;

heating the support plate, so that the support plate forces the display panel to bend; and separating the support plate from the display panel, thus forming the curved display panel.

Optionally, the step of bonding a display panel with the support plate includes:

coating a side, without the metal film deposited, of the first base with glue, and bonding the display panel with the first base through the glue.

Further, optionally, the glue is a liquid transparent optical adhesive.

Optionally, before the step of coating a side, without the metal film deposited, of the first base with glue, the step of bonding a display panel with the support plate further includes:

cleaning the first base and the display panel.

Optionally, the step of bonding a display panel with the support plate is executed in a vacuum environment.

Optionally, the display panel is a flexible display panel.

Optionally, the flexible display panel includes a substrate, which is a polymer substrate.

Optionally, the flexible display panel further includes a touch driving layer arranged on the polymer substrate and a protective layer arranged on the touch driving layer.

Optionally, the polymer substrate is made of a thermosetting or thermoplastic polymer material.

Optionally, the first base is a glass base.

Optionally, the metal film is made of aluminum.

Optionally, in the step of heating the support plate, the heating temperature is 150-250° C.

According to another aspect of the present invention, there is provided a curved display panel, which is manufactured by adopting the above manufacturing method.

According to a still another aspect of the present invention, there is provided a display device, including the above curved display panel.

The present invention has the following beneficial effects:

In the manufacturing method of the curved display panel provided by the present invention, as the first base of the support plate and the metal film have different thermal expansion coefficients, they have different amounts of expansion after being heated, thus the curved display panel can be manufactured by fixing the display panel onto the support plate and performing a heating treatment, and the manufacturing method is simple and easy to implement. The curved display panel provided by the present invention is manufactured by adopting the above method, and thus is low in cost. The display device provided by the present invention includes the above curved display panel, and thus is also low in production cost.

DETAILED DESCRIPTION OF THE EMBODIMENTS

In order that those skilled in the art can better understand the technical solutions of the present invention, the present invention will be further described in detail below in conjunction with the accompanying drawings and specific embodiments.

Embodiment 1

Figure 1:
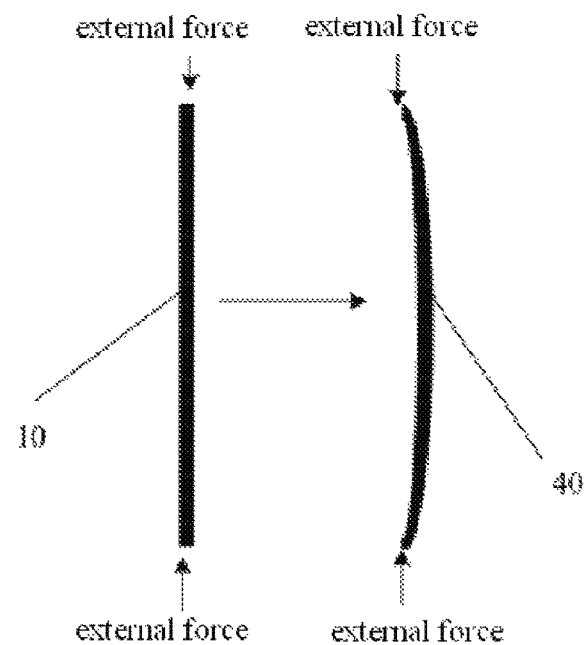
FIG. 1 is a schematic diagram of an existing manufacturing method of a curved display panel.
Figure 2:
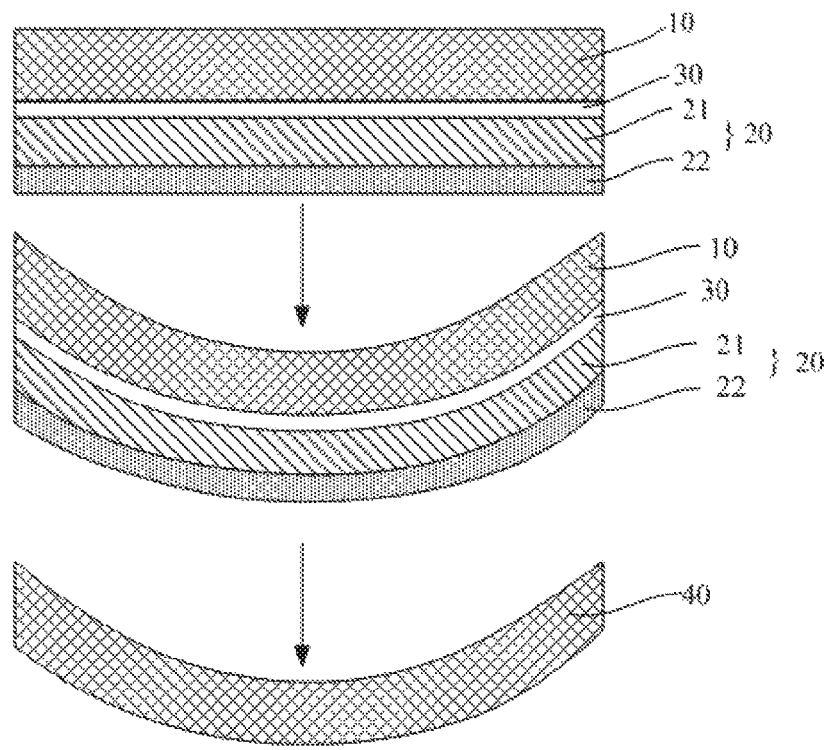
FIG. 2 is a schematic diagram of a manufacturing method of a curved display panel in Embodiment 1 of the present invention.

As shown in FIG. 2, this embodiment provides a manufacturing method of a curved display panel, which may include the following steps 1 to 4.

At step 1, a support plate 20 is prepared, wherein the support plate 20 includes a first base 21 and a metal film 22 deposited on one side of the first base 21, and the thermal expansion coefficient of the first base 21 is different from that of the metal film 22.

At step 2, a display panel 10 is bonded with the support plate 20;

This step may include: coating one side of the first base 21 of the support plate 20 (i.e., the side, without the metal film 22 deposited, of the first base 21) with glue 30, and bonding the display panel 10 with the first base 21 through the glue 30. The glue 30 may be liquid transparent optical adhesive (e.g. OCA and/or OCR). Moreover, the glue 30 may be coated in a fishbone shape, so that the display panel 10 is bonded with the support plate 20 more firmly.

Before the side, without the metal film 22 deposited, of the first base 21 of the support plate 20 is coated with the glue 30, the support plate 20 and the display panel 10 can be placed on an operating platform side by side, wherein the metal film 22 of the support plate 20 is in contact with the operating platform, and the first base 21 of the support plate 20 and the display panel 10 are cleaned with, for example, alcohol and a cleaning cloth. After the glue 30 is coated on the first base 21 of the support plate 20, the display panel 10 can be turned over above the support plate 20 by a manipulator to bond with the support plate 20. In order to avoid bubbles produced in the process of bonding the display panel 10 with the support plate 20, the environment can be vacuumized, that is, step 2 is executed in a vacuum environment.

It should be noted herein that, the first base 21 of the support plate 20 can also be arranged to be in contact with the operating platform in the above step, and accordingly, the glue 30 is coated on the metal film 22. In this embodiment, description is given by taking the case that the metal film 22 of the support plate 20 is arranged to be in contact with the operating platform as an example.

At step 3, the support plate 20 is heated, so that the support plate 20 propels the display panel 10 to bend.

In this step, the first base 21 of the support plate 20 is different from the metal film 22 in thermal expansion coefficient, so when the support plate 20 is heated, the support plate 20 necessarily bends towards the direction where the one with higher thermal expansion coefficient is located.

Specifically, the first base 21 may be made of glass, the metal film 22 may be made of aluminum, and the heating temperature is 150-250° C. Because aluminum is a metal with low melting point, atomic migration and re-crystallization occur within the temperature range of 150-250° C.; more importantly, the thermal expansion coefficient of aluminum is 25, while the thermal expansion coefficient of common glass is about 3.8, so the thermal expansion coefficient of aluminum is far greater than that of the glass base; thus, after heating, the amount of expansion of the metal film 22 made of aluminum is greater than that of the glass base 21, so that the support plate 20 bends towards the aluminum side (to form a concave curved surface shown in FIG. 2), and then forces the display panel 10 bonded with the support plate 20 to bend.

It should be noted that, although the first base 21 is made of glass and the metal film 22 is made of aluminum as an example in this embodiment, the materials of first base 21 and the metal film 22 are not limited to the aforementioned two materials, as long as the thermal expansion coefficients of the materials for the first base 21 and the metal film 22 are different.

It could be understood that, if the display panel 10 is bonded with the metal film 22 of the support plate 20 in this embodiment, the display pane 10 obtained after heating is a convex display panel, which is just opposite to the display panel 40 formed in the manufacturing method shown in FIG. 2 in bending direction.

At step 4, the support plate 20 is separated from the display panel 10, so that a curved display panel 40 is formed.

It should be noted that the display panel 10 in this embodiment may be a flexible display panel or a common display panel. Because the substrate material of the flexible display panel is soft, the manufacturing method of the curved display panel of this embodiment is particularly suitable for manufacturing a flexible curved display panel.

Figure 3:
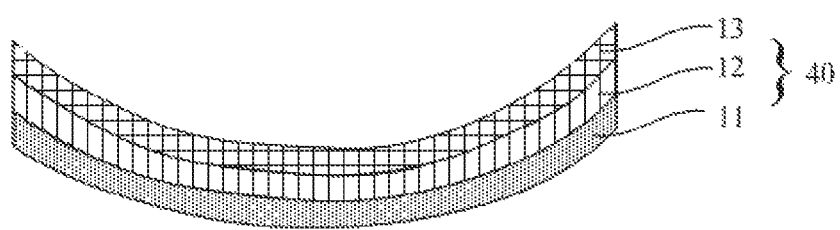
FIG. 3 is a schematic diagram of a curved display panel in Embodiment 1 of the present invention.

The substrate of the flexible display panel in this embodiment may be a polymer substrate 11, and a touch driving layer 12 and a protective layer 13 may be sequentially arranged on the polymer substrate 11, as shown in FIG. 3. It should be noted that the polymer substrate 11, the touch driving layer 12 and the protective layer 13 constitute a touch screen, and it could be understood by those skilled in the art that the display panel may be provided with other known structures such as an array substrate, a color filter substrate and the like according to the function to be realized, which will not be limited herein.

The polymer substrate 11 may be made of a thermosetting or thermoplastic polymer material. The bending angle of the polymer substrate 11 made of a thermoplastic polymer material may be randomly adjusted as required (that is to say, the bending angle of such polymer substrate 11 is adjustable); the thermosetting polymer material is a material which cures irreversibly, and the polymer substrate 11 made of this material can be formed to have a fixed bending angle as required.

In the manufacturing method of the curved display panel 40 provided by this embodiment, as the first base 21 of the support plate 20 and the metal film 22 have different thermal expansion coefficients, they also have different amounts of expansion after being heated, thus the curved display panel 40 can be manufactured by fixing the display panel 10 onto the support plate 20 and performing a heating treatment, and the method is simple and easy to implement. Moreover, the display panel 10 is bent by uniform stress applied on the whole surface thereof in the manufacturing method provided by this embodiment, so damage to the display panel is unlikely to occur. Meanwhile, the glue 30 adopted in the manufacturing method of the curved display panel 40 provided by this embodiment is liquid transparent optical adhesive, and thus the glue 30 has high transmittance and does not influence the display effect. In addition, in the case that the glue 30 is uniformly coated on the support plate 20 in a fishbone shape, bubbles are not produced when the display panel 10 is bonded with the support plate 20 in vacuum.

Accordingly, this embodiment further provides a curved display panel, which is manufactured by adopting the above manufacturing method, so it is simple in production process and low in cost.

Embodiment 2

This embodiment provides a display device, including the curved display panel provided in Embodiment 1. Thus, the display device in this embodiment is simple in production process and low in cost.

The display device may be any product or component with a display function, such as a mobile phone, a tablet computer, a television, a display, a notebook computer, a digital photo frame, a navigator or the like.

Of course, the display device in this embodiment may further include other conventional structures, such as a display driving unit and the like.

It could be understood that the above embodiments are merely exemplary embodiments adopted for describing the principle of the present invention, but the present invention is not limited thereto. Various variations and improvements may be made by those of ordinary skill in the art without departing from the spirit and essence of the present inven-

The invention claimed is:

1. A manufacturing method of a curved display panel, comprising steps of:
   preparing a support plate, which comprises a first base and a metal film deposited on one side of the first base, the thermal expansion coefficient of the first base being different from that of the metal film;
   bonding a display panel with the support plate;
   heating the support plate, so that the support plate forces the display panel to bend; and
   separating the support plate from the display panel to form the curved display panel.

2. The manufacturing method of claim 1, wherein the step of bonding a display panel with the support plate comprises:
   coating a side, without the metal film deposited, of the first base with glue, and bonding the display panel with the first base through the glue.

3. The manufacturing method of claim 2, wherein the glue is a liquid transparent optical adhesive.

4. The manufacturing method of claim 2, wherein before the step of coating a side, without the metal film deposited, of the first base with glue, the step of bonding a display panel with the support plate further comprises:
   cleaning the first base and the display panel.

5. The manufacturing method of claim 2, wherein the metal film is made of aluminum.

6. The manufacturing method of claim 1, wherein the step of bonding a display panel with the support plate is executed in vacuum.

7. The manufacturing method of claim 1, wherein the display panel is a flexible display panel.

8. The manufacturing method of claim 7, wherein the flexible display panel comprises a substrate, which is a polymer substrate.

9. The manufacturing method of claim 8, wherein the flexible display panel further comprises a touch driving layer arranged on the polymer substrate and a protective layer arranged on the touch driving layer.

10. The manufacturing method of claim 8, wherein the polymer substrate is made of a thermosetting polymer material.

11. The manufacturing method of claim 8, wherein the polymer substrate is made of a thermoplastic polymer material.

12. The manufacturing method of claim 1, wherein the first base is a glass base.

13. The manufacturing method of claim 1, wherein the metal film is made of aluminum.

14. The manufacturing method of claim 1, wherein in the step of heating the support plate, the heating temperature is 150-250° C.

* * * * *